US 6,597,777 B1

(12) United States Patent
Ho

(10) Patent No.: US 6,597,777 B1
(45) Date of Patent: Jul. 22, 2003

(54) METHOD AND APPARATUS FOR DETECTING SERVICE ANOMALIES IN TRANSACTION-ORIENTED NETWORKS

(75) Inventor: Lap-Wah Lawrence Ho, Atlantic Highlands, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/342,587

(22) Filed: Jun. 29, 1999

(51) Int. Cl.$^7$ ............................................. H04M 15/00
(52) U.S. Cl. ...................... 379/133; 379/111; 379/136; 379/112.01; 379/112.06; 379/112.04; 370/235
(58) Field of Search ................................. 379/133, 134, 379/136, 137, 138, 139, 111, 112.01, 112.04, 112.06, 112.03, 112.05, 112.07, 112.08, 112.09, 112.1, 243, 242, 1.01, 29.01; 370/230, 231, 233, 234, 229

(56) References Cited

U.S. PATENT DOCUMENTS 5,659,593 A * 8/1997 Tzvielli ........................ 379/13
5,699,403 A * 12/1997 Ronnen ........................ 379/32

FOREIGN PATENT DOCUMENTS

WO    WO 9624210 A    8/1996    ............ H04L/12/24

OTHER PUBLICATIONS

Feather, F., Siewiorek, D. and Maxion, R., "Fault Detection in an Ethernet Network Using Anomaly Signature Matching", *Computer Communication Review*, ACM SIGCOMM'93 conference Proceedings, vol. 23, No. 4, Sep. 13–17, 1993.
Maxion, R. and Feather, F., "A Case Study of Ethernet Anomalies in a Distributed Computing Enviroment", *IEEE Transactions on Reliability*, vol. 39, No. 4, Oct. 1990.
C.S. Hood et al., "Probabilistic Network Fault Detection," Global Telecommunications Conference (GLOBECOM), pp. 1872–1876, Nov. 18, 1996.

* cited by examiner

*Primary Examiner*—Rexford Barnie
(74) *Attorney, Agent, or Firm*—Stephen M. Gurey

(57) ABSTRACT

On a transaction network that supports short-duration electronic transactions within multiple service classes between input terminals and host processors, such as for credit card purchases, a network anomaly detector monitors the network to determine a potential fault either on or off the network before an actual network failure occurs. The network anomaly detector is provided with current transaction data for ongoing transactions, which data for each transaction includes the service class of the transaction, the start time of the transaction and the duration of the transaction. The current transaction data is converted to a traffic intensity, which provides a temporal measure of the traffic on the network within each predetermined binning interval for each service class. For each service class, that binning interval is computed by the detector as a function of the median of the durations of transactions having the same service class from past transaction data so that a large percentage of transactions would statistically be expected to have a duration less one interval. That binning interval is also used to convert historical transaction data for each class into temporal upper and lower traffic intensity thresholds. If the traffic intensity generated from current data exceeds the upper threshold or falls below the lower threshold by longer than a predetermined time, an alarm is sounded to indicate an anomaly. Corrective action can then be taken to remove the anomalous condition. Periodically, the historical data used to generate the upper and lower thresholds is updated with more recent transaction data so that the thresholds more closely follow current data trends.

37 Claims, 10 Drawing Sheets

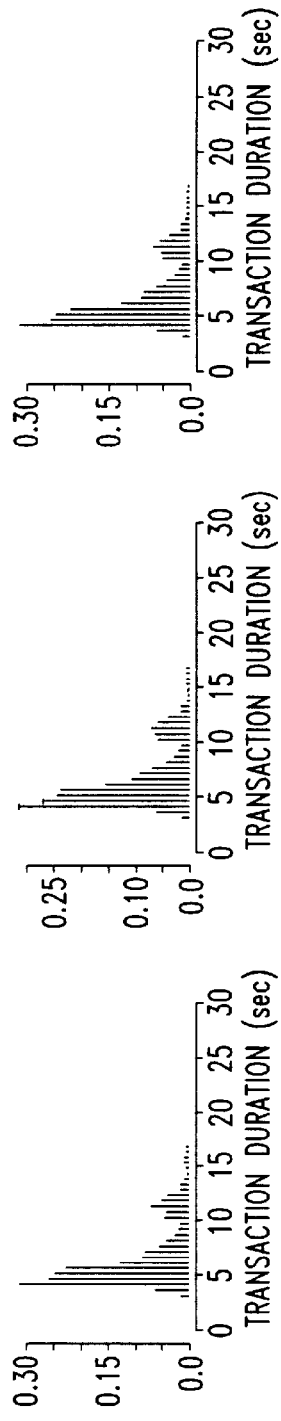 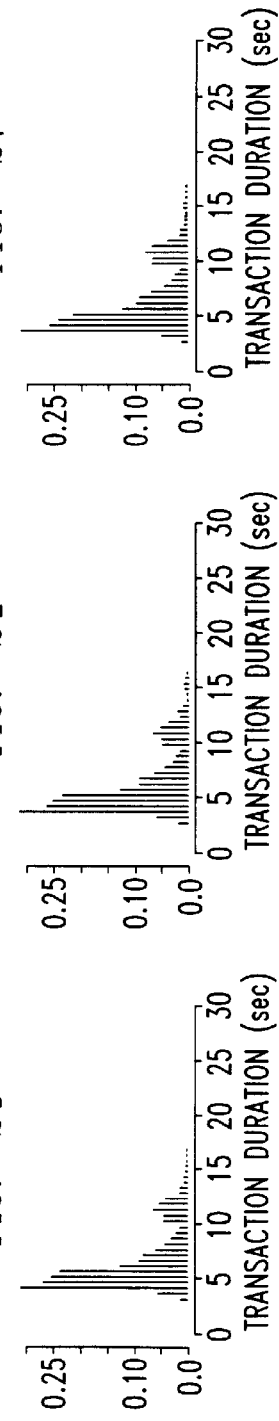  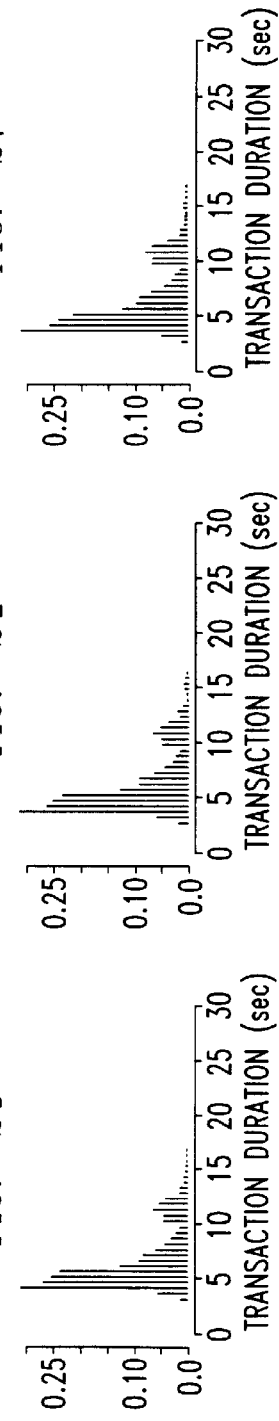   
FIG. 2A  FIG. 2B  FIG. 2C
FIG. 2D  FIG. 2E  FIG. 2F
FIG. 2G

METHOD AND APPARATUS FOR DETECTING SERVICE ANOMALIES IN TRANSACTION-ORIENTED NETWORKS

TECHNICAL FIELD

This invention relates to proactive fault detection and anomaly detection on transaction networks.

BACKGROUND OF THE INVENTION

Transaction-oriented networks, such as AT&T's Transaction Access Services (TAS) network, provide ubiquitous dial-to-packet services for carrying short-duration transaction traffic. Average usage of the TAS network can amount to millions of transactions on a non-busy and typical day. Usage of such transaction networks is continuing to grow at a rapid pace. Typical transactions support point-of sale applications and services (e.g., credit/debit card authorizations and settlements), health care applications, banking and vending applications, and other data-driven sales applications.

Such transaction-oriented networks can be data, telecom, or a combination of data and telecom wide area networks (WANs) that service such short-duration transactions (having a duration in the order of seconds) between a set of terminals (e.g., credit card scanners, or personal computers) and a set of processing servers (e.g., credit processing servers). FIG. 1 shows a typical network 101, such as the AT&T TAS network to which is connected a very large plurality of terminal equipment, such as credit card scanners 102-1–102-N, and a plurality of host processors 103-1–103-M. The AT&T TAS Network comprises three components: an AT&T 800 Network 104, TAS nodes 105, and the AT&T Packet network 106. The TAS network 101 enables transaction-oriented communication between any of the connected terminal devices 102, which are geographically scattered around the country, and their designated particular processing host. Access of the plural terminal devices 102 to the TAS network is through the 800 Network 104, which is terminated at the set of TAS nodes (modems) 105 where POTS-to-packet protocol conversion is effected. These nodes use the Dialed Number Identification Service (DNIS) digits provided by the 4ESS™ switches in the 800 network to establish switched virtual circuits (SVCs) in the packet network 106. The packet network 106 completes the connection between an individual terminal device 102-i initiating a transaction of a certain type and the particular host processor 103-j which can complete that type of transaction.

The TAS network 101 concurrently supports transactions of multiple service classes, where each service class represents a different type of transaction. Thus, VISA® credit card transactions directed to the particular VISA host processor that handles such transactions fall within one class, MasterCard® credit card transactions directed to the MasterCard host processor that handles such transactions fall within another class, health-card transactions for a particular pharmaceutical provider directed to that provider's host processor fall within a third class, etc. Transactions between classes are likely to have vastly different temporal characteristics, such as average transaction duration and duration distribution, due to the diverse nature of the type of transactions being supported between classes. Thus, for example, a credit card authorization for a purchase using a VISA credit card would be expected to be of shorter duration than a health-card transaction relating to a drug-refill order.

Because of the tremendously large number of transactions being supported on the network, it is extremely important that network failures and performance degradations be kept at a minimum. A network failure or performance degradation, for example, could easily affect the ability of consumers across the country to make purchases with their credit cards. Such a scenario could have severe economic repercussions to a large segment of the business community. Even the failure or performance degradation of a particular one host processor can strongly impact performances of other service classes and the network as a whole.

Currently network management systems monitor and manage the TAS nodes 105 in the TAS network 101 to detect performance failure in the modem circuitry. Such systems are reactive to a hard failure when it occurs. Similarly, management systems monitor switches in the 800 network 104 and switches in the packet network 106 and are also only reactive actual failures on the monitored part of the network. Thus, only the network itself and the components that comprise the network are currently being monitored and managed from within the network. With such management systems, therefore, the failure or performance degradation of any non-managed element cannot be detected.

It is often, however, the failure or performance degradation of a non-managed element that can have a severely deleterious effect on the entire network. For example, the performance degradation of a host processor serving transactions in a particular service class can result in not only denial of service to that one service class, but to transactions in other service classes which are being serviced by other host processors since all service classes share the same network infrastructure and resources. Further, during periods of high traffic intensity, such as during the Christmas holiday shopping season, resource services for the VISA and MasterCard service classes may be oversubscribed, resulting in the resource hijacking from these dominant service classes from other less dominant service classes resulting in a denial of access for transactions in these other less dominant service classes. Even further, on the transaction input side of the network, a general failure of unmanaged transaction terminals associated with a particular service class will remain undetected by a network management system that only monitors network elements.

It is desirable, therefore, to be able to measure and analyze network performance in real time from which an anomaly can be detected before an actual failure occurs so that corrective actions can be executed in time to avert failures. Fault detection on a local area network using anomaly detection is described by F. Feather, D. Siewiorek and R. Maxion, in a paper entitled "Fault Detection in and Ethernet Using Anomaly Signature Matching", *Computer Communication Review (ACM SIGCOMM'93)*, Vol. 23, No. 4, October, 1993. As described in that paper, observable network performance data is directly analyzed to detect anomalies. It has been found, however, that an analysis of directly observed network performance data does not provide sufficient sensitivity to enable off-network anomalies to be detected and thus proactively corrected. In addition, the techniques suggested by Feather et al. apply primarily to an ethernet local area network (LAN) environment.

SUMMARY OF THE INVENTION

In accordance with the present invention, proactive and automatic detection of network failures and performance degradations is achieved by first converting real-time network performance data into a performance-based objective function. The objective function, using current real-time data, is directly correlated with the particular anomalies which the network monitor is trying to detect. That objective function, generated from current data, is then compared with that same objective function as predicted from historical performance data to determine anomalies in the objective function generated from the current data which probabilistically signify a potential fault. Through such a real time comparison, alarms can be generated when anomalies are detected in the objective function generated from the current data.

In the embodiment of the present invention, an objective function used to characterize performance of transaction-oriented networks is defined as traffic intensity. For each transaction, the transaction is characterized by the service class that the transaction belongs to, the start time of the transaction, and the duration of the transaction. From current transaction data, for each service class, a time-dependent traffic intensity is computed that is defined as being equal to the total number of active transactions on the monitored network falling within a calculated binning interval. That binning interval, for each service class, is adaptively and dynamically determined from recent historical transaction records and is a function of the median and probability distribution of the transaction duration for that particular service class from such past data. From a larger past time-frame window of historical data, predicted baseline, and upper and lower time-dependent traffic intensity thresholds are determined for each service class using that binning interval. An anomaly is detected when the real-time traffic intensity at a certain time, computed from the current data using the determined binning interval, is greater than the predicted time-dependent upper threshold or less than the predicted time-dependent lower threshold for longer than a predetermined time interval. To account for the evolution of network traffic, the most recent performance data is periodically incorporated with the historical data to update the performance thresholds and baseline. Upon detecting an anomaly, an alarm can be sounded, such as through a graphic user interface (GUI), to alert a network operator of the presence of network anomalies and faults. The operator can then identify the service class or classes associated with the anomaly and determine the possible cause(s) of the anomaly. Alternatively or cooperatively with a GUI, upon detecting an anomaly, a network control module can be signaled for automatic feedback and control such as the detachment from the network of a potentially offending host processor, or the initiation of a rerouting module. Upon detection of an anomaly, the data giving rise to that anomaly is removed from the database to prevent use of that data as part of the historical data used to recalculate binning intervals, and the baseline and upper and lower thresholds.

BRIEF DESCRIPTION OF THE DRAWING

FIGS. 2A–2G show the normalized probability distribution functions of transaction durations for a particular service class for a Monday-Sunday, respectively;

DETAILED DESCRIPTION

The present invention will be described below for detecting network/service anomalies on a transaction-oriented wide area network (WAN), such as the AT&T Transaction Access Service (TAS) network 101 shown in FIG. 1. It should be understood that the described embodiment is not limited to detecting network/service anomalies on this type of network, or necessarily on a WAN. Rather, the invention can be applied to detect network/service anomalies on any type of network from which an objective function can be generated from current observable real-time network performance data, and which objective function can then be compared with that objective function as generated from historical network performance data, to detect an anomaly in the objective function generated from current performance data.

Figure 1:
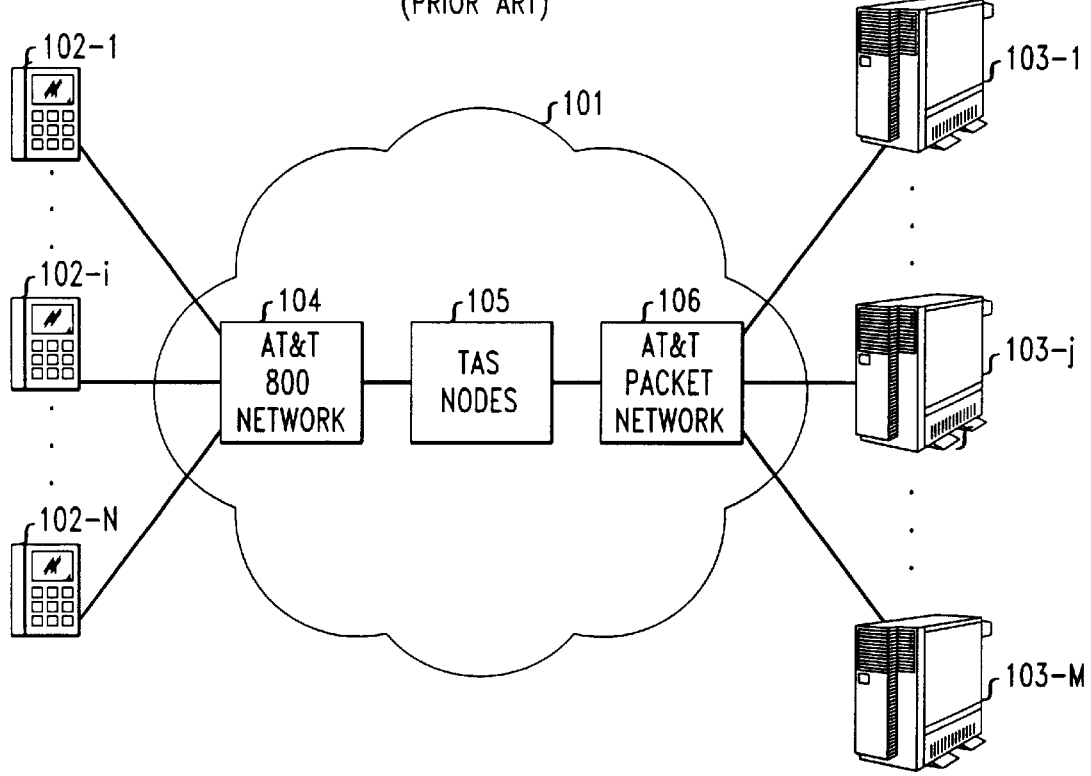
FIG. 1 is a block diagram of a prior art transaction network of a type for which the present invention can detect anomalies originating from within the network or off the network.

On the present transaction-oriented network 101 in FIG. 1, which services short-duration transactions between a set of terminals 102-1–102-N, and a plurality of host processors 103-1–103-M, each transaction is uniquely identified with the following 4-tuple:

$$(i, s, t_{i,s}, \Delta t_{i,s}) \tag{1}$$

where

"i" denotes the transaction identifier,

"s" denotes the service class identifier the transaction belongs to, $t_{i,s}$ denotes the start time of the transaction, and $\Delta t_{i,s}$ denotes the duration of the transaction (for each service class "s", $\Delta t_{i,s}$ has a median, upper and lower quartiles, and probability distribution function).

The transaction identifier uniquely identifies a transaction (e.g., such as a counter of positive integers as transactions emerge in the network). The service class identifier identifies which service class a transaction belongs to. For example, a VISA credit card transaction and a health care related transaction (e.g., drug-refill order) are two different classes of transactions. They belong to two different service classes (in a typical multi-service-class network, the number of service classes can amount to tens or even hundreds), one having a much longer median transaction duration than that of the other. Formally, each transaction service class has its own median transaction duration, its own upper and lower quartile, and its own probability distribution function (PDF) of transaction durations.

Within each service class, an analysis of the transaction data (the 4-tuple of equation (1)), shows a consistent duration distribution on day-to-day weekday basis, with possibly a different duration distribution on each weekend day and on holidays. As an example, FIGS. 2A–2G show the normalized probability distributions of transaction durations for a particular service class, designated herein as service class 1, for Monday-Sunday, respectively. In order to develop reliable and effective network/service anomaly detection, the statistical properties of the random observables (such as the transaction duration) need to be relatively invariant in time (and hence predictable into the future on average). From the PDFs of transaction duration of service class 1 in FIGS. 2A–2G, their day-to-day Monday-Friday weekday repeatable nature is observable. Further, a week-to-week weekend and holiday consistency could also be observed (not shown).

Figure 3:
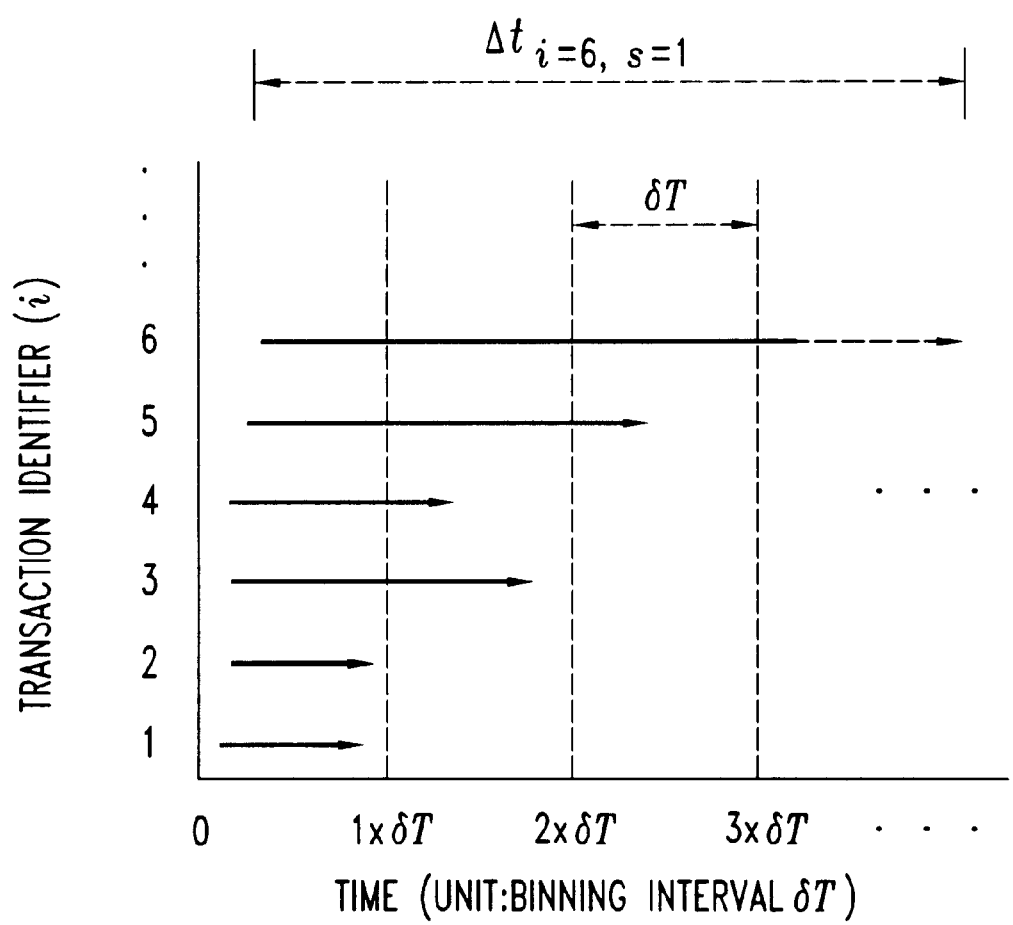
FIG. 3 illustrates how traffic intensity is determined on an arrival diagram showing transactions represented as arrows.
Figure 4C:
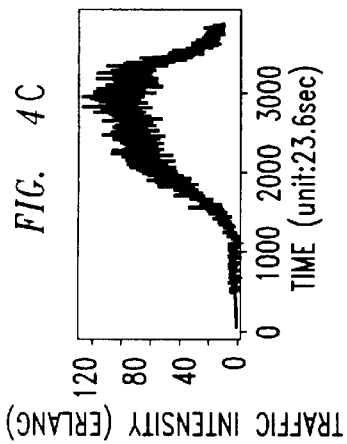
FIGS. 4A–4G show the traffic intensities corresponding to the probability distribution functions in FIGS. 2A–2G, respectively.
Figure 4F:
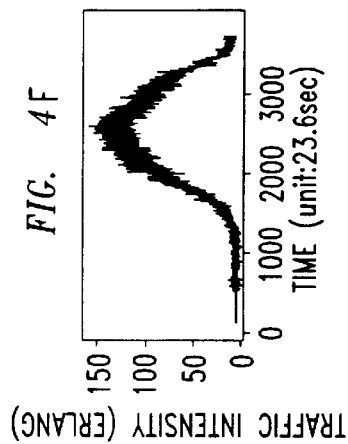
Figure 4B:
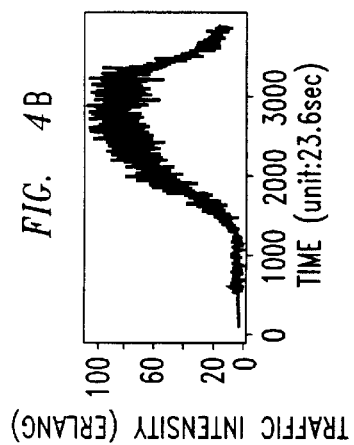
Figure 4E:
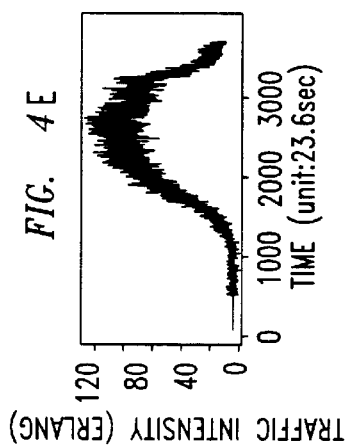
Figure 4A:
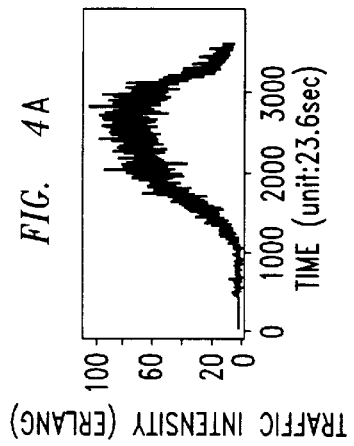
Figure 4D:
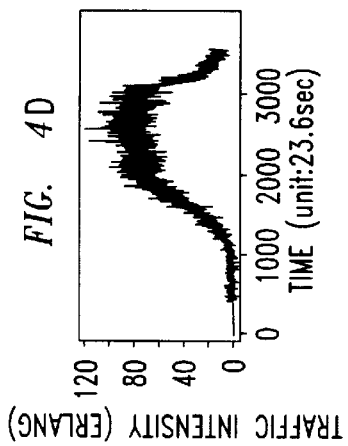
Figure 4G:
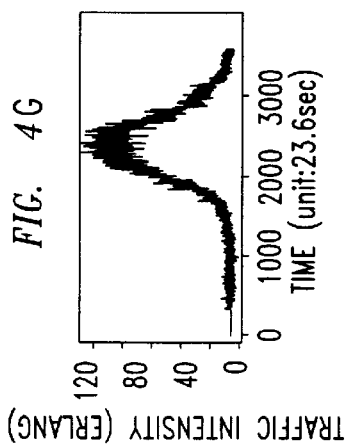

In accordance with the present invention, the objective function chosen for anomaly detection is a service-class based traffic intensity. Traffic intensities are directly computed from the observed transaction duration and transaction initiation time for those transactions within each service class. Traffic intensity is a measure of the number of active transactions devoted to a particular service class as a function of time, subject to the size of a binning interval, $\delta T$. As will be discussed hereinafter, the binning interval, $\delta T$, is a variable determined as a function of the median transaction duration so that probabilistically a very large percentage of all transactions will have a duration of less than that binning interval. FIG. 3 shows transactions represented as arrows in an arrival diagram (the x-axis represents ongoing time in the units of $\delta T$, while the y-axis spans different transactions represented by an integer set of transaction identifiers). With this representation, the start times of transactions are represented as the tails of the transaction arrows, while the transaction durations are represented by the lengths of the transaction arrows. Within each binning interval of duration $\delta T$, the traffic intensity is equal to the total number of transactions falling either partially or completely within that bin. The transaction number is computed by summing all transactions (i.e., arrows) that fall in that bin, $\delta T$, and the traffic intensity $I_s$, for a service class s at a time $T_{n,s}$ and is given by:

$$I_s(T_{n,s}) = \sum_i \Delta t_i / \delta T_s \bigg|_{T=T_{n,s}} ; T_{n,s} = n \times \delta T_s, n = 0, 1, \ldots, N_s. \tag{2}$$

For the six illustrative transactions shown in FIG. 3, the first bin ($0 < T \leq \delta T$) includes all six transactions and hence six units (circuits or Erlangs) of traffic intensity; the second bin ($\delta T < T \leq 2\delta T$) includes four transactions and hence four units of traffic intensity; and the third bin ($2\delta T < T \leq 3\delta T$) includes two transactions and hence two units (circuits or Erlangs) of traffic intensity.

What follows immediately hereinafter is the mathematical basis and confirmation from actual data that justifies use of traffic intensity as a objective function that can be used for anomaly detection in accordance with the present invention. Following this analysis, the anomaly detection methodology of the present invention will be described.

The Monday-Sunday traffic intensities of what is designated as service class 1 are shown in FIGS. 4A–4G, respectively, as generated from the corresponding PDFs shown in FIGS. 2A–2G using the mathematical definition of traffic intensity of equation (2). The binning interval used to generate the traffic intensities in these FIGS. was chosen to be 23.6 sec. As previously noted, and as will be further explained, the binning interval is a function of the median of transactions, so that transactions with high probabilities of being anomalous are highlighted in the traffic intensities. For this data, the binning interval of 23.6 sec represents four times the median transaction duration from historical data in the particular service class being observed.

Figure 5A:
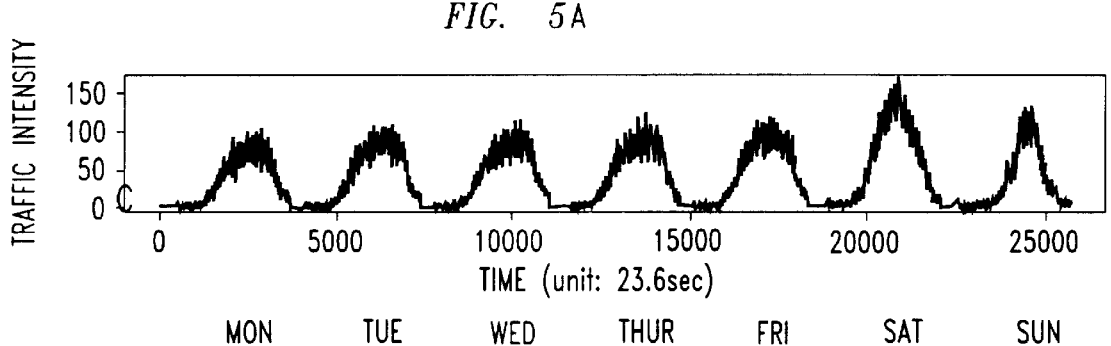
FIGS. 5A–5C show on a single time scale, the week-long traffic intensity, the corresponding weekday and weekend/holiday contributions, and a corresponding error function, respectively.
Figure 5B:
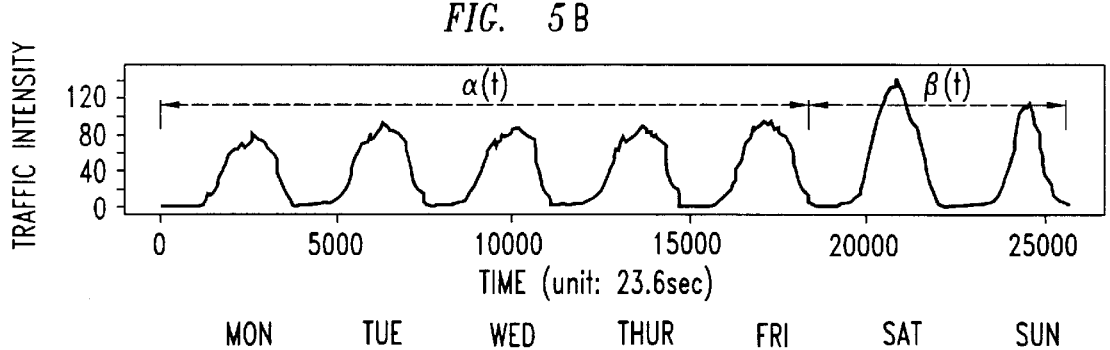
Figure 5C:
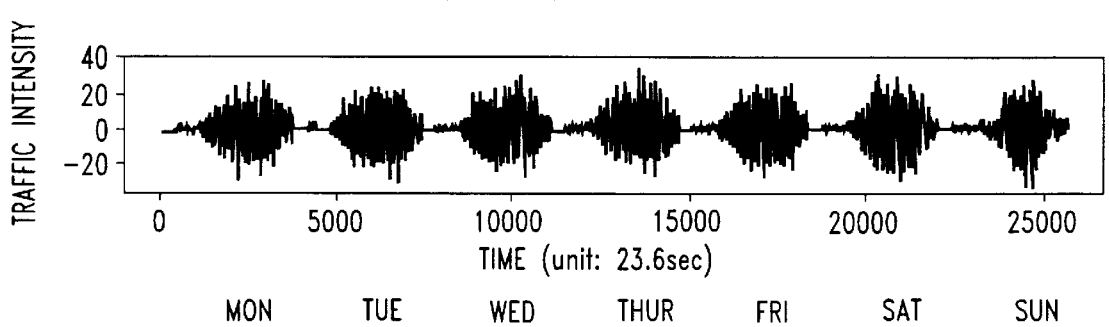

From an analysis of a large data set (one year worth of data) of the service-class based traffic intensities, daily, weekly, and weekend/holiday components were found to exist. Using an analysis of variance, the traffic intensity for a service class "s" can be approximated by the non-stationary time series:

$$I_s(t) = \alpha^s_{wk}(t) + \beta^s_{wked}(t) + \varepsilon_s(t), \tag{3}$$

where $\alpha(t)$ is the weekday contribution to the traffic intensity, $\beta(t)$ is the weekend (Saturday, Sunday, and holiday) contribution, and $\epsilon(t)$ is the error function (relative fluctuation), which effectively measures the deviation of the traffic intensities from the weekday and weekend baselines. FIGS. 5A–5C show on a single time scale, the week-long traffic intensity of service class 1 in FIG. 5A, the corresponding weekday contribution $\alpha(t)$ and weekend/holiday contribution $\beta(t)$ in FIG. 5B., and the corresponding error function $\epsilon(t)$ in FIG. 5C. On a week day: $\beta(t)=0$ for all t; on a weekend day: $\alpha(t)=0$ for all t. The time average of $\epsilon(t)$ is found have a power dependence to the time average of $\alpha(t)$ and $\beta(t)$, such that $$\langle [\varepsilon(t)]^2 \rangle_t \propto \{\langle [\alpha(t)]^2 \rangle_t\}^r, 1.1 \leq r \leq 1.5, \tag{4}$$

where the time averages are taken over a duration of one order of magnitude greater than the binning interval (for the data associated with service class 1, that number is 240 seconds).

The $\alpha(t)$s and $\beta(t)$s of service classes can be approximated by the following relationships:

$$\alpha^s_{wk,j}(t) = \sum_{k=1}^{j-1} c^s_{j,k} \alpha^s_{wk,k}(t) + \Delta^s_{wk}; \tag{5}$$

where $\sum_{k=1}^{j-1} c^s_{j,k} = 1$, and $j = 1, \ldots, 5$ (i.e., Mon to Fri)

$$\beta^s_{wked,j}(t) = \sum_{k=1}^{j-1} d^s_{j,k} \beta^s_{wk,k}(t) + \Delta^s_{wked}; \tag{6}$$

where $\sum_{k=1}^{j-1} d^s_{j,k} = 1$, and $j = 1, \ldots 4$ (i.e., monthly)

$$\{\langle [\varepsilon^s_{wk,j}(t)]^2 \rangle_t\}^{1/2} = \sum_{k=1}^{j-1} c^s_{j,k} \{\langle [\varepsilon^s_{wk,k}(t)]^2 \rangle_t\}^{1/2}, \tag{7}$$

$$\{\langle [\varepsilon^s_{wked,j}(t)]^2 \rangle_t\}^{1/2} = \sum_{k=1}^{j-1} d^s_{j,k} \{\langle [\varepsilon^s_{wked,k}(t)]^2 \rangle_t\}^{1/2}$$

which means that the current $\alpha(t)$ and $\beta(t)$ can be predicted (i.e., extrapolated) from a series of $\alpha(t)$s and $\beta(t)$s and scaling factor cs and ds from the previous five weekdays or four previous weekend days (one month), subject to errors $\Delta s$. In practice, the scaling factors cs and ds are determined from the ratios of $\alpha(t)$s and $\beta(t)$s of the previous week and month, respectively, i.e., $$c^s_{m,n} = \overline{\langle \alpha^s_{wk,m}(t) \rangle_t / \langle \alpha^s_{wk,n}(t) \rangle_t} \text{ and } d^s_{m,n} = \overline{\langle \beta^s_{wked,m}(t) \rangle_t / \langle \beta^s_{wked,n}(t) \rangle_t}, \tag{8}$$

where the inner time-averages are computed for the duration of 10 binning intervals while the outer average is computed for the entire day (or 4 weeks in the case of the ds). Typical values of Δ range from 5% to 15%, making the prediction of traffic intensities highly reliable, a fact that is exploited by the anomaly detection methodology of the invention.

Having justified the above-defined and described traffic intensity as an objective function, the use of that function, which is derived from the network transaction data, for adaptive network anomaly detection in accordance with the present invention will be described. Broadly, the adaptive anomaly detection methodology consists of three component processes: (1) for each service class, a binning interval is determined as a function of the median of transaction durations of past transaction data, the binning interval being chosen so that from the distribution of transaction durations in the data being used to derive the binning interval, only a small percentage (e.g., ≦10%) of transaction durations are greater than the binning interval; (2) using the binning interval determined in the first process for each service class, temporal-based baseline, and upper and lower thresholds performance thresholds of traffic intensity (corresponding to the predictive α(t), β(t), and ε previously described) for each service class are derived from historical transaction data; and (3) in each service class, and using the binning interval determined for that class in the first part, real time transaction data is converted into a temporal traffic intensity and compared with the temporal upper and lower thresholds to determine whether the real time traffic intensity exceeds or falls below the upper or lower thresholds, and if so, by how much degree and for how long. From such comparison, the presence of an anomalous condition can be detected and acted upon either manually through operator intervention, or automatically through network control modules.

The network anomaly detector that performs the above three-described functional processes, is implemented in the embodiment of the present invention as real-time software that adaptively converts the performance data of the managed network to an objective function for each service class (i.e., traffic intensity) to detect anomalies in the traffic intensity in each service class relative to historical baselines or statistically expected behaviors of such traffic intensities, which anomalies are signatures of soft and hard network faults.

In the first process, the transaction records generated by network switches are binned, according to a binning strategy that depends on the historical performance of the service class in question to detect transactions that have high probabilities for being anomalous. Using equation (2), transaction durations (time-stamped by $t_i$) are computed to form traffic intensities at discrete time intervals for every service class. The traffic intensity of a service class provides a measure of the total number of circuits dedicated to that service class in real-time. For a service class "i", its traffic intensity $I_s(T_{n,s})$ at discrete time $T_{n,s}$ (n is an integer, where its maximum value $N_s$ determines the total number of daily time intervals) is given by equation (2), where transactions within a time bin (defined by the binning interval $\delta T_s$, which is service-class dependent) for the service class are summed; and $N_s=(24 \times 60 \times 60)/\delta T_s$ (where the unit of $\delta T_s$ –is sec) is the daily number of time bins of "s". The binning interval $\delta T_s$ is adaptive and dynamically determined from historical transaction records. In the particular embodiment of the present invention the historical transaction records used to determine $\delta T_s$ comprise a past day's worth of transaction records in that service class. The value of $\delta T_s$ is related to the median of transaction durations from that historical data and the PDF of such transaction durations within a service class, and is determined so that only a small percentage of historical transaction durations (e.g., 5%) exceed that binning interval. Thus, when that binning interval is applied to real-time transaction data, transactions with high probability of being anomalous will be preferentially highlighted.

In the embodiment of the invention, the binning interval is directly proportional to the median of the transaction duration of a service class. Specifically for this embodiment, $$\delta T_s = 4 \times \text{median}(\Delta t_{i,s}). \tag{9}$$

where the factor of four has been determined from empirical data so that approximately 95% of all transaction durations will probabilistically be expected to be less than that binning interval.

In the second component process, using the binning interval determined for each service class in the first process, temporal-based performance measuring traffic intensity thresholds are determined for each class using a larger body of historical data. For monitoring a TAS or a TAS-like transaction network, traffic intensity thresholds of each TAS service class are classified into four separate day-related groups: weekdays, Saturdays, Sundays, and holidays. The historical data for each service class and for each day-related group are then used to construct adaptive temporal traffic intensity thresholds for each TAS service class for each day-related group.

For each of the four threshold groups, a set of adaptive thresholds are determined to predict the expected performance of TAS services on weekdays, Saturdays, Sundays and holidays, respectively. Each set of dynamic thresholds (upper and lower thresholds) is composed of a predicted baseline $\tilde{I}_s(T_{n,s})$ and tolerance $\tilde{\sigma}_s(T_{n,s})$ (where "~" denoted a predicted value) as follows:

$$\text{upper\_threshold} = \tilde{I}_s(T_{n,s}) + 2\tilde{\sigma}_s(T_{n,s}) \Big|_{\substack{wkdys \\ sats \\ suns \\ holiday}} \tag{10}$$

$$\text{baseline} = \tilde{I}_s(T_{n,s}) \Big|_{\substack{wkdys \\ sats \\ suns \\ holiday}} \tag{11}$$

$$\text{lower\_threshold} = \tilde{I}_s(T_{n,s}) - 2\tilde{\sigma}_s(T_{n,s}) \Big|_{\substack{wkdys \\ sats \\ suns \\ holiday}} \tag{12}$$

The baseline $\tilde{I}_s(T_{n,s})$ and tolerance $\sigma_s(T_{n,s})$ are computed from historical transaction data through a one-dimensional time series analysis and are classified into the "weekday", "Saturday", "Sunday", and "holiday" classes. The $\tilde{I}_s(T_{n,s})$s represent the predicted average traffic intensities of service classes, while the $\sigma_s(T_{n,s})$s represent the predicted average fluctuations of the corresponding traffic intensities. Both $\tilde{I}_s(T_{n,s})$s and $\sigma_s(T_{n,s})$s are updated periodically using the most recent transaction data to account for the evolution in network traffic.

The predicted $\tilde{I}_s(T_{n,s})$s and $\sigma_s(T_{n,s})$s are computed from the equation (5) to equation (8), explicitly:

$$\tilde{I}_s(t) = \alpha_s(t) + \beta_s(t) \tag{13}$$

$$\tilde{\sigma}_s(t) = \{\langle [\varepsilon^s(t)]^2 \rangle_t\}^{1/2}. \tag{14}$$

Since current α(t) and , β(t) and ε(t) can be computed from their past values through equations (5), (6), and (7)

respectively, as previously described, the upper/lower thresholds and the baselines of the temporal traffic intensity for a service class can be predicted from historical network data from that service class. In the specific embodiment of the present invention, five weekdays worth of transaction data are used to for weekdays and four consecutive weekend days are used to determine the baseline and upper and lower traffic intensity thresholds in each service class for weekend days.

Expected performances of TAS services are predicted through the above thresholds, and deviations (in both magnitude and duration, as defined by a set of fault criteria) from the expected are indications of network/service anomalies.

In anomaly detection, an alarm is sounded that signals the arrival of a network/service anomaly if (1) the measured (in real-time) traffic intensity $I_{s,measured}(T_{n,s})$ at time $T_{n,s}$ deviates beyond the upper or lower thresholds; and (2) the previous condition persists for more than $T_{persist}$, i.e., $$\left| \sum_{T}^{T_{persist}} E_s(T_{n,s}) \right| \geq \sum_{T}^{T_{persist}} a\tilde{\sigma}_s(T_{n,s}), \quad (15)$$

where $E_s(T_{n,s})$ is an error signal that is determined according to whether the measured traffic intensity falls below or above the predicted lower or upper thresholds, respectively, as follows:

if $I_{s,measured}(T_{n,s}) \leq [\tilde{I}_s(T_{n,s}) - 2\tilde{\sigma}_s(T_{n,s})]$: $E_{s,lower}(T_{n,s}) = I_{s,measured}(T_{n,s}) - \tilde{I}_s(T_{n,s})$ (16)

if $I_{s,measured}(T_{n,s}) \geq [\tilde{I}_s(T_{n,s}) + 2\tilde{\sigma}_s(T_{n,s})]$: $E_{s,upper}(T_{n,s}) = -I_{s,measured}(T_{n,s}) + \tilde{I}_s(T_{n,s})$. (17)

where separate comparisons are made depending upon whether the current day of the week is a weekday, Saturday, Sunday, or a holiday.

The choice of the parameters, "$\alpha$" and $T_{persist}$, in the equation (15) are determined experimentally. In the specific embodiment of the present invention an alarm is sounded to signal the detection of a network/service anomaly if the real-time traffic intensity $I_{s,measured}(T_{n,s})$ at time $T_{n,s}$ deviates from the upper or lower thresholds for a duration of more than 15 minutes, i.e., $$\left| \sum_{T}^{T_{persist}} E_{s,lower}(T_{n,s}) \right| \geq \sum_{T}^{T_{persist}} a\tilde{\sigma}_s(T_{n,s}), (\geq 15 \text{ mins}) \quad (18)$$

$$\left| \sum_{T}^{T_{persist}} E_{s,upper}(T_{n,s}) \right| \geq \sum_{T}^{T_{persist}} a\tilde{\sigma}_s(T_{n,s}), (\geq 15 \text{ mins}) \quad (19)$$

which again is dependent upon the day of week (weekday, Saturday, Sunday, holiday). In equations (18) and (19) the choice of the parameter 15 minutes is chosen for a TAS network fault management embodiment in which network performance data is delivered on a 15 minute basis. Thus, anomalous events which persist for less than 15 minutes cannot be detected in real time. The parameter a in equations (15), (18) and (19) is determined from an analysis of experimental TAS transaction data.

Figure 6:
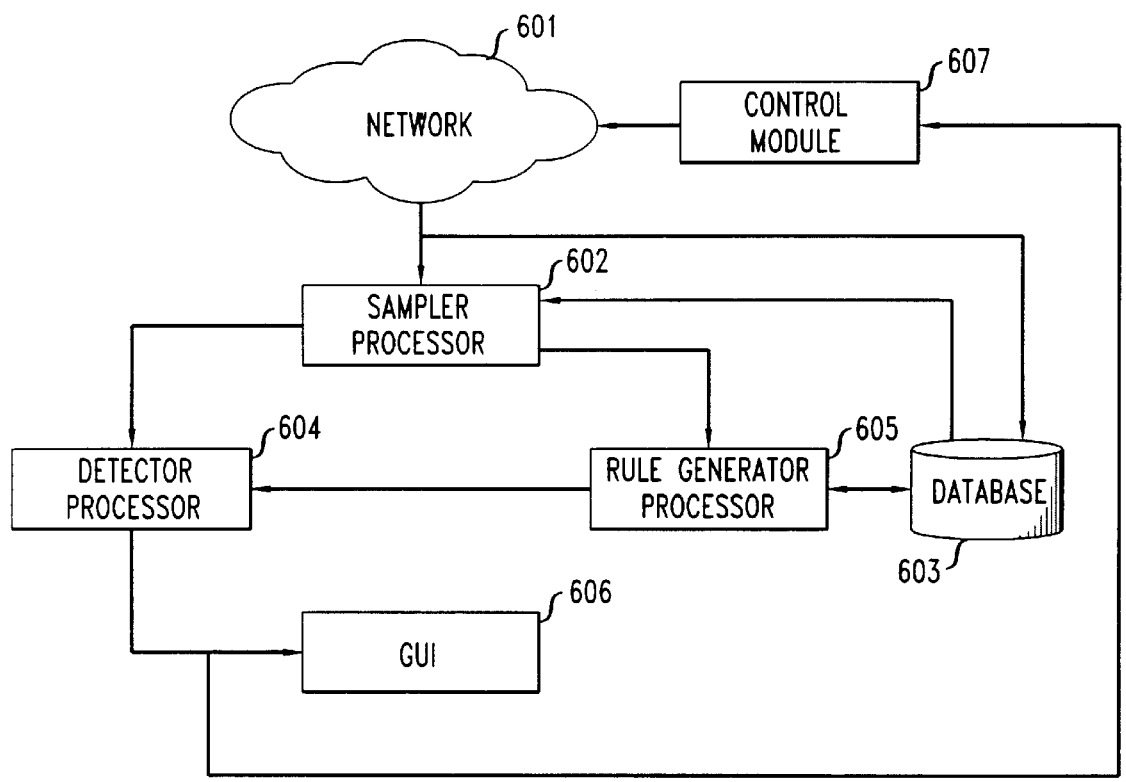
FIG. 6 is a block diagram showing the architecture of the transaction anomaly detection system of the present invention.

The architecture of the transaction anomaly detection system of the present invention is shown in FIG. 6. Transaction data, in the form, for example, of 4-tuples per equation (1) are continuously supplied from the monitored network 601 at the end of each 15 minute interval to a sampler processor 602 and to a database 603. Using a past day's worth of transaction data in each service class supplied from database 603 (assuming the past day and the current day are both weekdays), sampler processor 602 computes the binning interval for each service class as a function of the median transaction duration using equation (9). Then, using the computed binning interval for each service class, sampler processor 602 processes the real-time transaction data to produce the current real-time traffic intensity for each service class. The real-time traffic intensity in each service class is then provided to a detector processor 604. Detector processor 604 is also supplied with the temporal baseline, and upper and lower thresholds for each service class from a rule generator processor 605 for a type of day as the current day. Rule generator processor 605, using the binning interval determined by sampler processor 602, and the historical data stored in database 603 from the past week's data for weekdays or month's data for weekend days, derives the temporal baseline, upper and lower adaptive thresholds for each service class for weekdays and weekend days, respectively. Detector processor 604, upon determining that the current traffic intensity in any service class falls above the upper threshold or below the lower threshold for a duration of 15 or more minutes, generates an alarm. That alarm is provided to a GUI 606 and/or to one or more corrective control modules 607 connected to network 601. GUI 606 can include a control panel, an alarm log, and a traffic visualizer.

Figure 7:
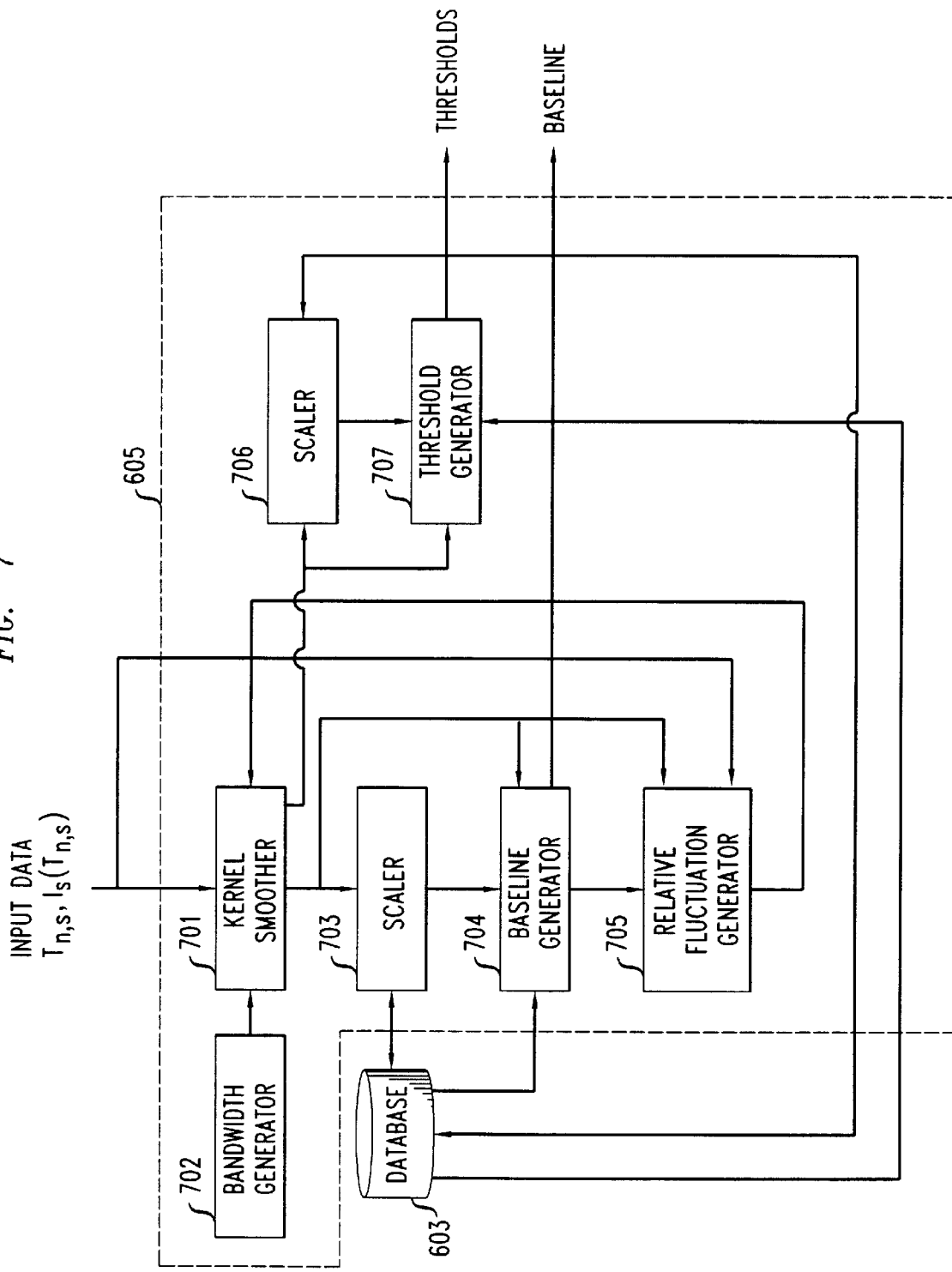
FIG. 7 is a functional block diagram of a rule generator processor within the anomaly detection system of FIG. 6.

FIG. 7 is a functional block diagram that illustrates how rule generator processor 605 determines the baseline and upper and lower thresholds from historical data. Raw service-class-based historical data of transaction time and traffic intensity, $T_{n,s}$ and $-I_s[T_{n,s}]$, from equations (1) and (2) for a past 24 hour period for every service class are inputted into a kernel smoother 701, which uses a triangular decaying function with pre-computed bandwidth via bandwidth generator 702 to smooth the raw traffic intensity. Bandwidth generator 702 determines how many data points are to be smoothed. The smoothed traffic intensity of the last 24 hour period day is then divided bin-by-bin with the corresponding traffic intensities, Is, of the previous five week days, obtained from database 603, by scaler 703. The result is five scaling factors, the cs in equation (8), which are then stored in database 603. The five scaling factors of the next day in the previous week (i.e., six days previous) are then retrieved from database 603, and together with the traffic intensities, Is, from the past 24 hours and the previous four weekdays, are used by baseline generator 704 to compute the predicted baseline for the coming day using equation (5). The same procedure is applied to weekend days through equation (6) except that instead of using five previous weekdays, four previous Saturdays or Sundays are used and the corresponding scaling factors, ds in equation (8), are computed by scaler 703. The current smoothed traffic intensity I is then used by relative fluctuation generator 705 to compute the fluctuation ($\sigma$ in equation (14) and equation (3)) with respect to the non-smoothed raw traffic intensity I. The fluctuation then undergoes the same scaling steps, used above for traffic intensity, using scaler 706 to compute its own weekday and weekend scaling factors, the cs and ds, respectively. These scaling factors are then used by threshold generator 707 to compute the predicted upper and lower thresholds through equations (7) and (14). The outputs of baseline generator 704 and threshold generator 707 are the predicted baselines and thresholds for every service class for both weekdays and weekends.

Figure 8:
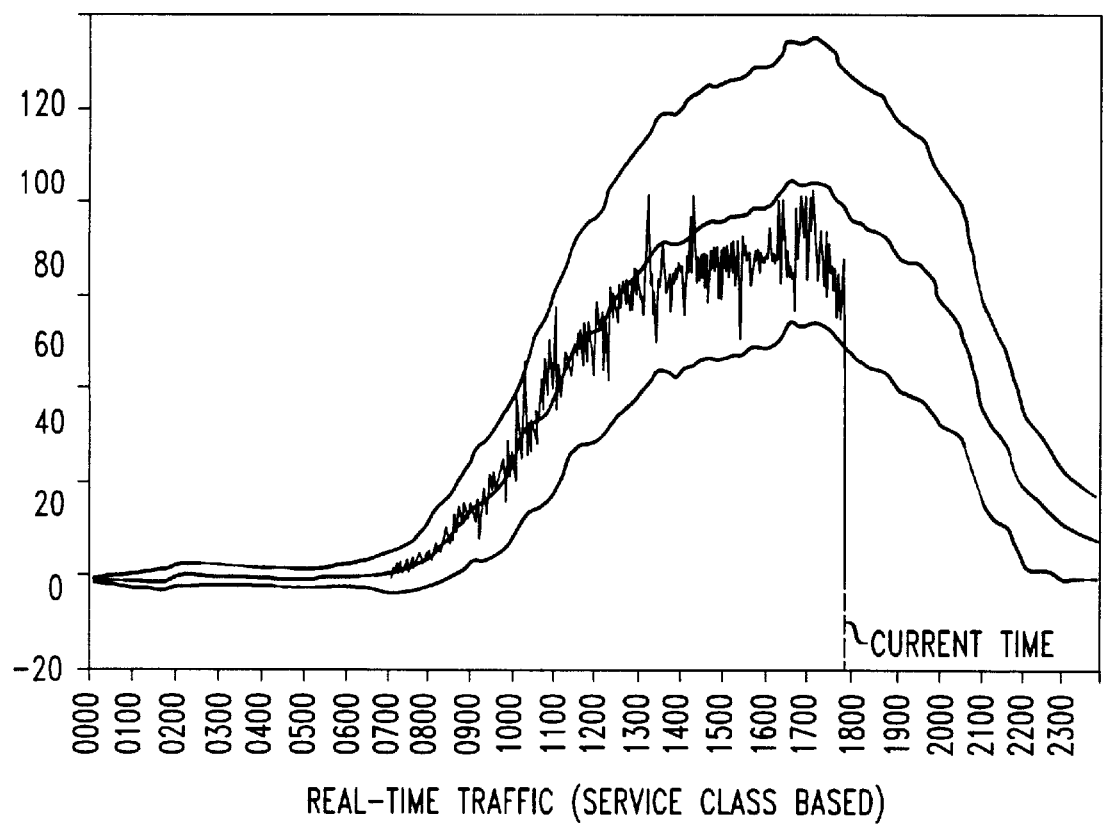
FIG. 8 is a visualization instance on a GUI for a particular service class generated during normal operating conditions showing the real-time traffic intensity up to a current time.
Figure 9:
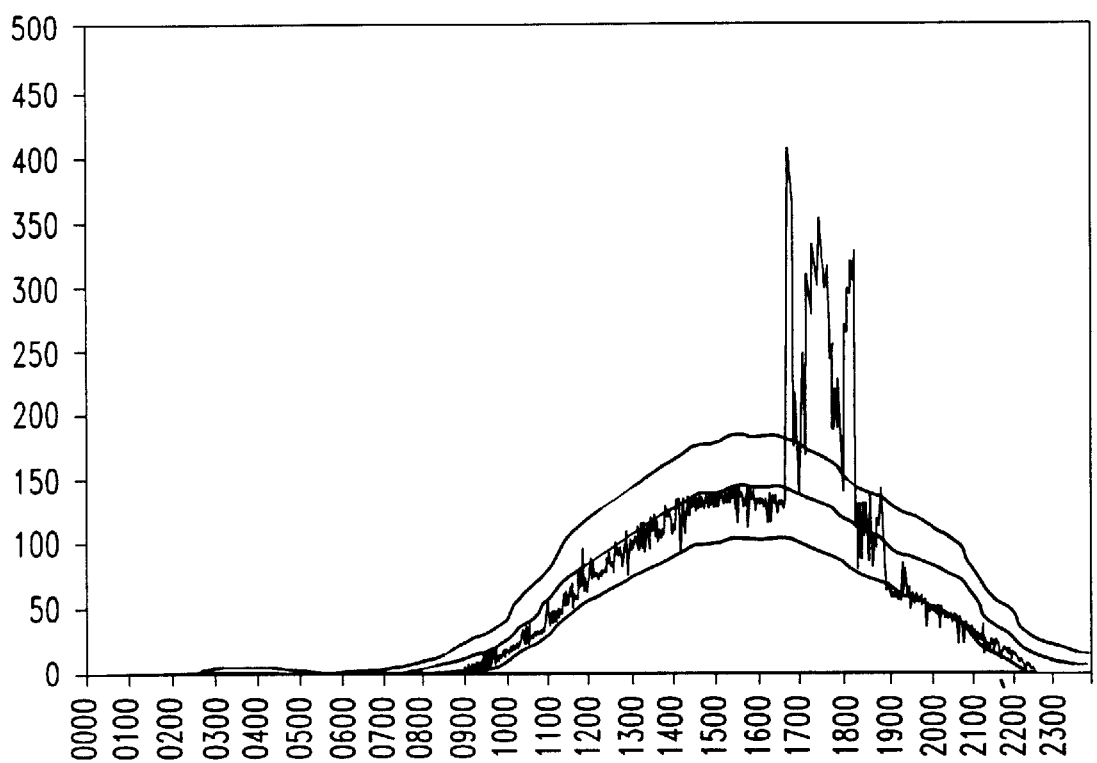
FIG. 9 is a visualization instance on a GUI of an anomalous condition generated upon a crash of a transaction server for a particular service class when such condition is not detected by the present invention.

FIG. 8 is a visualization instance for a particular service class generated during normal operating conditions that shows the real-time traffic intensity for a given day up to a current time. FIG. 9 is a visualization instance showing the traffic intensity for a particular service class upon an anomalous condition that could have been generated upon a crash of transaction servers of a particular credit card processing service class. This figure illustrates the effect on traffic intensity for that particular service class without the benefit of the present invention. Upon the onset of a server failure, the failing service class unfairly ties up network resources (physical circuits in the telcom network, and virtual circuits in the data network) resulting in spikes in the transaction intensity. As shown in FIG. 9, this condition persists for over two hours. The present invention, however, detects the fact that the traffic intensity persistently exceeds the upper threshold within the first 15 minutes of the onset of the server failure and detects the service class with which the failure is associated. A network manager, upon observance of the generated alarm and the visualization data can then take corrective action to minimize the effect of the noted anomaly in the traffic intensity of the affected service class. Thus, by noting the service class in which an anomaly has been detected, the network manager can redirect traffic on the network, select other access points onto the network, or scale back the resources allocated to a particular affected service class to prevent resource hijacking by that affected service class from other service classes. With reference back to FIG. 6, in addition to or in place of GUI 606, one or more corrective control modules 607 connecting detector 604 and network 601, may be responsive to a generated alarm for automatic corrective action such as the triggering of a circuit breaker to disconnect service to a crashing transaction server and/or a rerouting module for rerouting traffic in the network.

As time proceeds forward and current transaction data is stored in database 603, the more recent data is periodically incorporated with the older data so that rule generator processor 605, in determining the upper and lower performance thresholds, may use the more current data to account for the evolution of network traffic statistics. When an anomaly is detected, however, the current transaction data which produced that anomaly is removed from any storage location within database 603 which stores current data to prevent that anomalous data from contaminating any subsequent calculations of the binning interval and the baseline and upper and lower thresholds.

Figure 10:
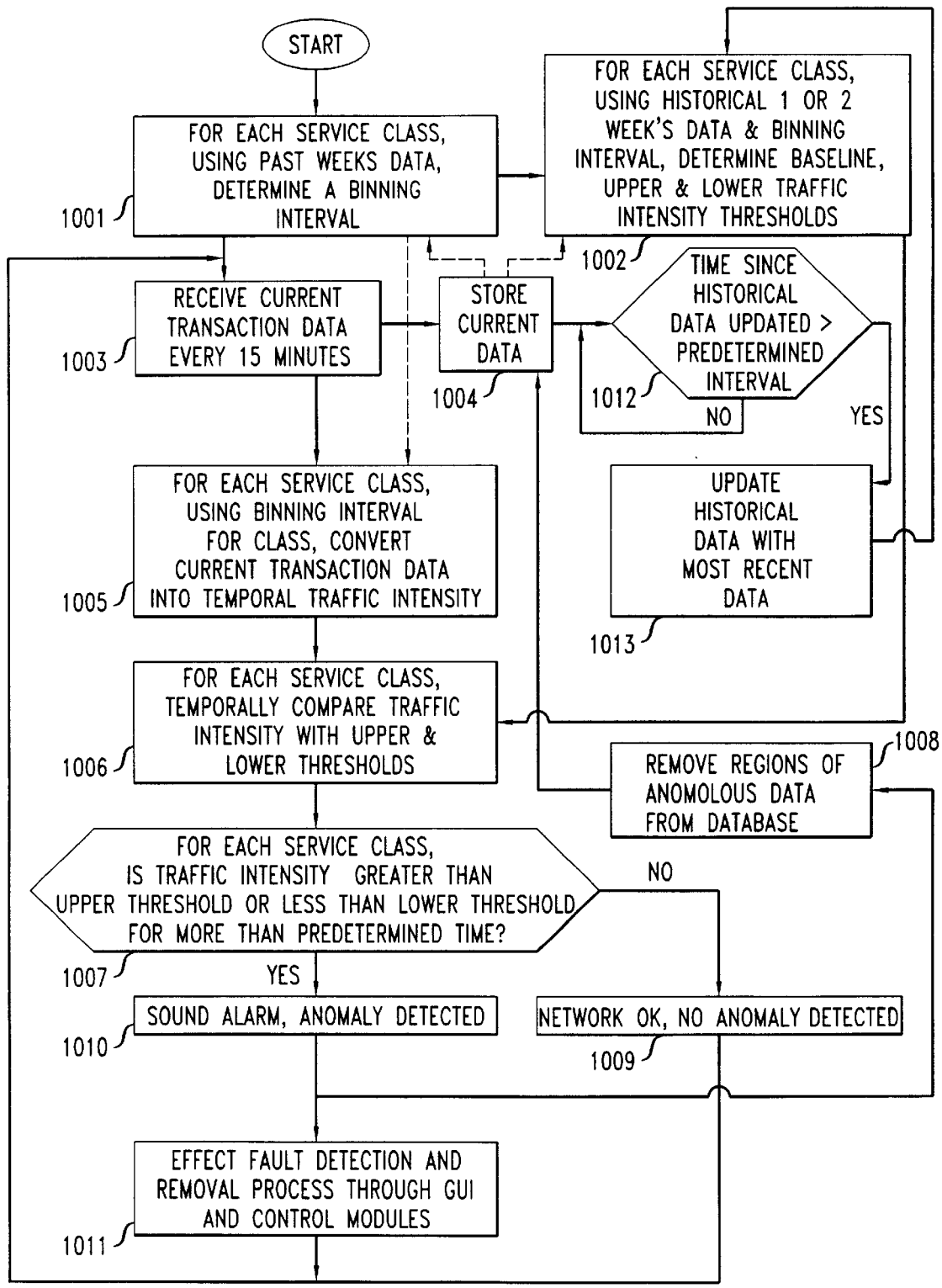
FIG. 10 is a flow chart summarizing the method of the present invention.

FIG. 10 is a flow chart which summarizes the method of the present invention. At step 1001, for each service class, using a past week's transaction data, a binning interval is determined. At step 1002, for each service class, using the determined binning interval for that service class, temporal baseline, upper and lower traffic intensity thresholds are determined. At step 1003, current transaction data is received every 15 minutes. That data is stored at step 1004 while, at step 1005, for each service class, using the binning interval determined at step 1001 for each service class and the current transaction data for each service class, a current temporal traffic intensity is determined. At step 1006, for each service class, the current traffic intensity is compared with the temporally associated upper and lower thresholds determined at step 1002. At decision step 1007, for each service class a determination is made whether the current traffic intensity is greater than the upper threshold or less than the lower threshold for longer than a predetermined time. If no, then at step 1009, no anomaly is detected. If yes at decision step 1007, then, at step 1010, an anomaly is detected associated with the service class(es) for which the current traffic intensity has exceeded or fell below the upper and lower thresholds, respectively. At step 1011, fault detection and removal of an offending service class is effected through a GUI or control modules connected to the network. Processing continues at step 1003, where new current transaction data continues to be received and stored, at step 1004, in a database. Following step 1004, at step 1012, a determination is made whether a greater than a predetermined interval has elapsed since the historical data used to determine the upper and lower thresholds was updated with more current data. If that predetermined interval has elapsed, then, at step 1013, the historical data is updated with the more recent data so that the baseline, upper and lower thresholds determined at step 1002 from historical data statistically reflect the statistical evolution of current data.

As previously noted, the present invention is not limited to determining anomalies on a wide area transaction network. It can be equally applied to determine anomalies on any type of network by converting performance data observed on a network into an objective function that is sensitive to anomalies which may be indicative of a network fault. The foregoing description, therefore, merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language that have been recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements made herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

The functions of the various elements shown in the FIGS., including functional blocks labeled as "processors" or "servers" may be provided through the use of dedicated hardware as well as hardware capable of executing software in association with appropriate software. When provided by a processor, server or computer, the functions may be provided by a single dedicated processor, by a single shared processor, or by a plurality of individual processors, some of which may be shared. Moreover, explicit use of the term "processor", "server", or "computer" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide these functionalities as being equivalent to those shown herein.

The invention claimed is:

1. A method of detecting an anomaly on a transaction network over which transactions in a plurality of service classes are electronically conducted, the network providing transaction data which includes for each transaction, a service class of the transaction, a start time of the transaction and a duration of the transaction, the method comprising the steps of:

determining a binning interval for a service class from past transaction data associated with that particular service class;

using that binning interval, deriving a temporal traffic intensity for that particular service class from current transaction data associated with that particular service class, the traffic intensity representing the traffic in the network at a given time within a binning interval;

using that binning interval, deriving temporally varying upper and lower transaction intensity thresholds for that particular service class from historical transaction data associated with that service class;

comparing, for that particular service class, the traffic intensity derived from the current transaction data with values of the upper and lower thresholds at times corresponding to times associated with the current transaction data; and determining that an anomaly is associated with that particular service class when the comparing step shows that the transaction intensity derived from current transaction data is above the upper threshold or below the lower threshold for longer than a predetermined time.

2. The method of claim 1 wherein separate upper and lower thresholds are derived in accordance with whether a transaction occurs on a weekday or a non-weekday, the comparing step of comparing the transaction intensity derived from the current transaction data with the appropriate weekday or non-weekday upper and lower thresholds in accordance with whether the current transaction data is associated with a weekday or a non-weekday.

3. The method of claim 1 wherein the binning interval is determined as a function of the median of durations of transactions in the past transaction data.

4. The method of claim 3 wherein the binning interval is determined so that a substantially high percentage of transactions within that particular service class in the past transaction data have a duration less than the binning interval.

5. The method of claim 4 wherein the substantially high percentage is greater than 90 percent.

6. The method of claim 1 further comprising the step of generating an alarm when an anomaly is determined to be associated with a particular service class.

7. The method of claim 6 wherein the alarm is displayed on a graphical user interface.

8. The method of claim 1 further comprising the step of taking corrective action in the network when an anomaly is determined to be associated with a particular service class.

9. The method of claim 1 further comprising the steps of updating the historical transaction data from which the temporally varying upper and lower transaction intensity thresholds for a particular service class are derived with more recent transaction data associated with that service class, and re-deriving the temporally varying upper and lower transaction intensity thresholds for that service class from that updated historical transaction data.

10. The method of claim 9 further comprising the step of, before updating the historical transaction data, removing from the more recent transaction data any data associated with producing a determined anomaly.

11. Apparatus for detecting an anomaly on a transaction network over which transactions in a plurality of service classes are electronically conducted, the network providing transaction data which includes for each transaction, a service class of the transaction, a start time of the transaction and a duration of the transaction, the apparatus comprising:

means for determining a binning interval for a service class from past transaction data associated with that particular service class;

means for deriving a temporal traffic intensity for that particular service class from current transaction data associated with that particular service class using the determined binning interval, the traffic intensity representing the traffic in the network at a given time within a binning interval;

means for deriving temporally varying upper and lower transaction intensity thresholds for that particular service class from historical transaction data associated with that service class using the determined binning interval;

means for comparing, for that particular service class, the traffic intensity derived from the current transaction data with values of the upper and lower thresholds at times corresponding to times associated with the current transaction data; and means for determining that an anomaly is associated with that particular service class when the means for comparing determines that the transaction intensity derived from current transaction data is above the upper threshold or below the lower threshold for longer than a predetermined time.

12. The apparatus of claim 11 wherein the means for deriving upper and lower thresholds derives separate upper and lower thresholds in accordance with whether a transaction occurs on a weekday or a non-weekday, the comparing means for comparing the transaction intensity derived from the current transaction data with the appropriate weekday or non-weekday upper and lower thresholds in accordance with whether the current transaction data is associated with a weekday or a non-weekday.

13. The apparatus of claim 11 wherein the means for determining a binning interval determines the binning interval as a function of the median of durations of transactions in the past transaction data.

14. The apparatus of claim 13 wherein the means for determining a binning interval determines the binning interval so that a substantially high percentage of transactions within that particular service class in the past transaction data have a duration less than the binning interval.

15. The apparatus of claim 14 wherein the substantially high percentage is greater than 90 percent.

16. The apparatus of claim of claim 11 further comprising means for generating an alarm when an anomaly is determined to be present.

17. The apparatus of claim 16 further comprising means for notifying a network operator when an alarm is generated.

18. A network anomaly detector for detecting an anomaly on a transaction network over which transactions are electronically conducted, the network providing transaction data which includes for each transaction, a start time of the transaction and a duration of the transaction, the anomaly detector comprising:

a sampler processor to calculate a binning interval from durations of stored historical transaction data and to use that binning interval to produce as an output a temporal traffic intensity of current transaction data;

a rule generator processor using the calculated binning interval to produce as outputs temporal upper and lower thresholds of transaction intensity of stored historical transaction data; and a detector processor to temporally compare the traffic intensity output of the sampler processor and the temporal upper and lower threshold outputs of the rule generator processor and to produce an output when traffic intensity is above the upper threshold or below the lower threshold for longer than a predetermined time.

19. A computer readable medium storing computer program instructions which are executable on a computer system for a network anomaly detector which detects an anomaly on a transaction network over which transactions in a plurality of service classes are electronically conducted, the network providing transaction data which includes for each transaction, a service class of the transaction, a start time of the transaction and a duration of the transaction, said computer program instructions comprising instructions defining the steps of:

determining a binning interval for a service class from past transaction data associated with that particular service class;

using that binning interval, deriving a temporal traffic intensity for that particular service class from current transaction data associated with that particular service class, the traffic intensity representing the traffic in the network at a given time within a binning interval;

using that binning interval, deriving temporally varying upper and lower transaction intensity thresholds for that particular service class from historical transaction data associated with that service class;

comparing, for that particular service class, the traffic intensity derived from the current transaction data with values of the upper and lower thresholds at times corresponding to times associated with the current transaction data; and determining that an anomaly is associated with that particular service class when the comparing step shows that the transaction intensity derived from current transaction data is above the upper threshold or below the lower threshold for longer than a predetermined time.

20. The computer readable memory of claim 19 wherein the computer program instructions further comprise the steps of:

updating the historical transaction data from which the temporally varying upper and lower transaction intensity thresholds for a particular service class are derived with more recent transaction data associated with that service class; and re-deriving the temporally varying upper and lower transaction intensity thresholds for that service class from that updated historical transaction data.

21. The computer readable memory of claim 20 wherein the computer program instructions further comprise the step of:

before updating the historical transaction data, removing from the more recent transaction data any data associated with producing a determined anomaly.

22. A method of detecting an anomaly on a transaction network comprising the steps of:

deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

using the binning interval, deriving a temporally varying upper transaction intensity threshold from the historical transaction data;

comparing at temporally corresponding times the traffic intensity derived from the current real-time transaction data with the upper transaction intensity threshold derived from the historical transaction data; and determining that an anomaly is present when the comparing step shows that the transaction intensity derived from the current transaction data is greater than the temporally varying upper transaction intensity threshold for longer than a predetermined time.

23. A method of detecting an anomaly on a transaction network comprising the steps of:

deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

using the binning interval, deriving a temporally varying lower transaction intensity threshold from the historical transaction data;

comparing at temporally corresponding times the traffic intensity derived from the current real-time transaction data with the lower transaction intensity threshold derived from the historical transaction data; and determining that an anomaly is present when the comparing step shows that the transaction intensity derived from the current transaction data is less than the temporally varying lower traffic intensity threshold for longer than a predetermined time.

24. A method of detecting an anomaly on a transaction network comprising the steps of:

deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

using the binning interval, deriving a temporally varying upper transaction intensity threshold and a temporally varying lower transaction intensity threshold from the historical transaction data;

comparing at temporally corresponding times the traffic intensity derived from the current real-time transaction data with the upper and lower transaction intensity thresholds derived from the historical transaction data; and determining that an anomaly is present when the comparing step shows that the transaction intensity derived from the current transaction data is greater than the temporally varying upper transaction intensity threshold or less than the temporally varying lower transaction intensity for longer than a predetermined time.

25. The method of claims 22, 23 or 24 wherein the substantially high percentage is greater than 90 percent.

26. The method of claims 22, 23 or 24 further comprising the step of generating an alarm when an anomaly is determined to be present.

27. The method of claim 26 wherein the alarm is displayed on a graphical user interface.

28. The method of claims 22, 23, or 24 further comprising the step of taking corrective action in the network when an anomaly is determined to be present.

29. A transaction network anomaly detector comprising:

means for deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

means for deriving a temporally varying upper transaction intensity threshold from the historical transaction data using the binning interval;

means for comparing at temporally corresponding times the traffic intensity derived from the current real-time transaction data with the upper transaction intensity threshold derived from the historical transaction data; and means for determining that an anomaly is present when the means for comparing determines that the transaction intensity derived from the current transaction data is greater than the temporally varying upper transaction intensity threshold for longer than a predetermined time.

30. A transaction network anomaly detector comprising:

means for deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

means for deriving a temporally varying lower transaction intensity threshold from the historical transaction data using the binning interval;

means for comparing at temporally corresponding times the traffic intensity derived from the current real-time transaction data with the lower transaction intensity threshold derived from the historical transaction data; and means for determining that an anomaly is present when the means for comparing determines that the transaction intensity derived from the current transaction data is less than the temporally varying lower traffic intensity threshold for longer than a predetermined time.

31. A transaction network anomaly detector comprising:

means for deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

means for deriving a temporally varying upper transaction intensity threshold and a temporally varying lower transaction intensity threshold from the historical transaction data using the binning interval;

means for comparing at temporally corresponding times the traffic intensity derived from the current real-time transaction data with the upper and lower transaction intensity thresholds derived from the historical transaction data; and means for determining that an anomaly is present when the means for comparing determines that the transaction intensity derived from the current transaction data is greater than the temporally varying upper transaction intensity threshold or less than the temporally varying lower transaction intensity for longer than a predetermined time.

32. A computer readable medium storing computer program instructions which are executable on a computer system for a transaction network anomaly detector, said computer program instructions comprising instructions defining the steps of:

deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

using the binning interval, deriving a temporally varying upper transaction intensity threshold from the historical transaction data;

comparing at temporally corresponding times the traffic intensity derived from the current real-time transaction data with the upper transaction intensity threshold derived from the historical transaction data; and determining that an anomaly is present when the comparing step shows that the transaction intensity derived from the current transaction data is greater than the temporally varying upper transaction intensity threshold for longer than a predetermined time.

33. A computer readable medium storing computer program instructions which are executable on a computer system for a transaction network anomaly detector, said computer program instructions comprising instructions defining the steps of:

deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

using the binning interval, deriving a temporally varying lower transaction intensity threshold from the historical transaction data;

comparing at temporally corresponding times the traffic intensity derived from the current real-time transaction data with the lower transaction intensity, threshold derived from the historical transaction data; and determining that an anomaly is present when the comparing step shows that the transaction intensity derived from the current transaction data is less than the temporally varying lower traffic intensity threshold for longer than a predetermined time.

34. A computer readable medium storing computer program instructions which are executable on a computer system for a transaction network anomaly detector, said computer program instructions comprising instructions defining the steps of:

deriving a temporal traffic intensity function from current real-time transaction data which includes for each transaction, a start time of the transaction and a duration of the transaction, the traffic intensity being determined within successive binning intervals that each have a length that is determined as a function of the durations of transactions in historical transaction data obtained from the network so that a substantially high percentage of transactions in the historical transaction data have a duration less than the binning interval;

using the binning interval, deriving a temporally varying upper transaction intensity threshold and a temporally varying lower transaction intensity threshold from the historical transaction data;

comparing at temporally corresponding times the traffic intensity derived from the current real-time transaction data with the upper and lower transaction intensity thresholds derived from the historical transaction data; and determining that an anomaly is present when the comparing step shows that the transaction intensity derived from the current transaction data is greater than the temporally varying upper transaction intensity threshold or less than the temporally varying lower transaction intensity for longer than a predetermined time.

35. The network anomaly detector of claims 29, 30, or 31 wherein the substantially high percentage is greater than 90 percent.

36. The network anomaly detector of claims 29, 30, or 31 further comprising means for generating an alarm when an anomaly is determined to be present.

37. The network anomaly detector of claim 36 further comprising means for notifying a network operator when an alarm is generated.

* * * * *